J. MILLER.
DRAFT EQUALIZER.
APPLICATION FILED JULY 3, 1913.
1,088,715.
Patented Mar. 3, 1914.
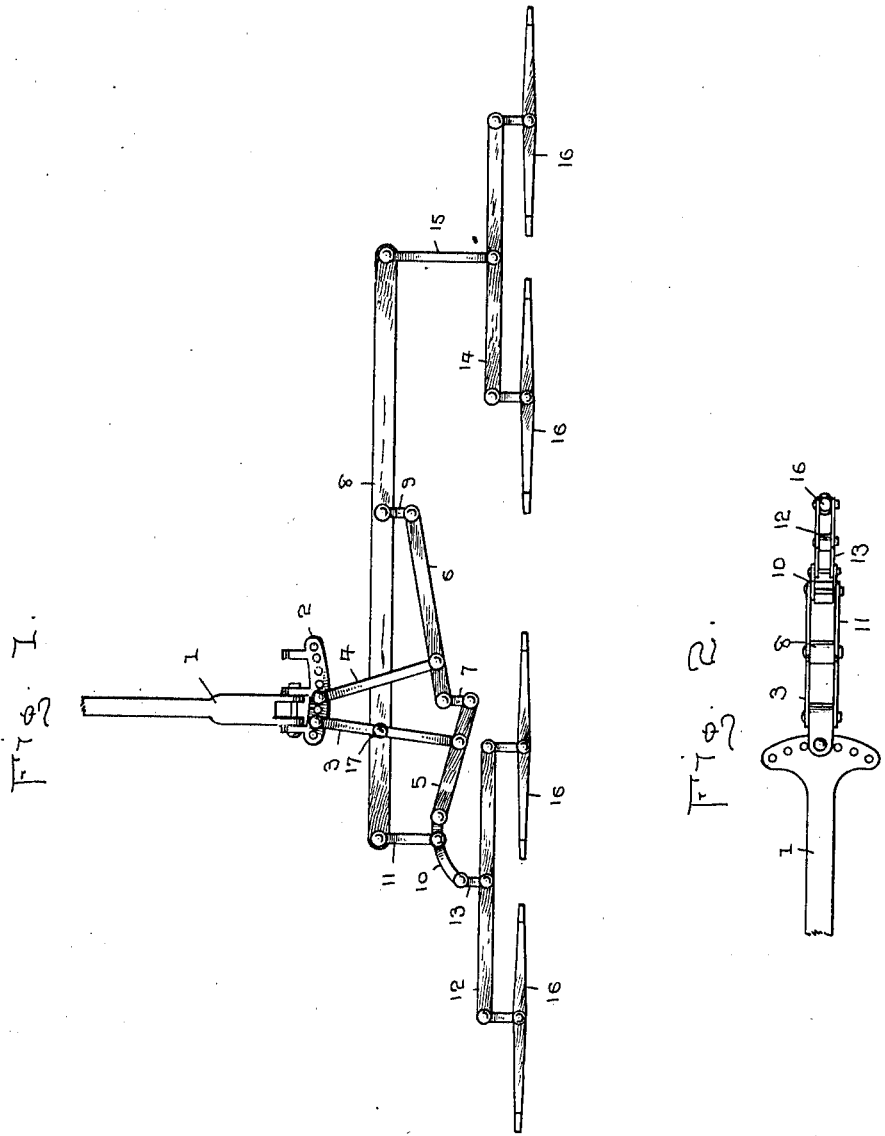

UNITED STATES PATENT OFFICE.

JOSEPH MILLER, OF RAMONA, KANSAS.

DRAFT-EQUALIZER.

1,088,715.  Specification of Letters Patent.  Patented Mar. 3, 1914.

Application filed July 3, 1913. Serial No. 777,316.

*To all whom it may concern:*

Be it known that I, JOSEPH MILLER, a citizen of the United States, residing at Ramona, in the county of Marion and State of Kansas, have invented certain new and useful Improvements in Draft-Equalizers; and I do hereby declare the following to be a full, clear, and exact description of the invention, such as will enable others skilled in the art to which it appertains to make and use the same.

This invention relates to draft equalizers, and has for its object to provide a simple and effective device for evenly distributing the pull of a number of draft animals.

Improved details in the construction and arrangement of the various parts of the invention will be apparent from the detailed description hereinafter when read in connection with the appended claim, reference being had to the accompanying drawing forming part hereof, in which, Figure 1 represnts a top plan view of the equalizer. Fig. 2 represents an end elevation thereof.

Referring to the drawing wherein similar reference characters indicate the same parts throughout the several views, the numeral 1 indicates a plow beam, and 2 indicates a clevis attached to the front end of said beam, said clevis extending a distance to either side of the beam and having a series of openings therein. Attached to the clevis 2 are two pairs of straps 3 and 4. The forward ends of the pairs of straps 3 and 4 are connected, respectively, to auxiliary bars 5 and 6, the latter being linked together at 7.

The auxiliary bar 6 is linked to the bar 8 by the links 9, and the other auxiliary bar 5 carries a curved lever 10, which in turn is pivotally connected with the bar 8 by the links 11. The free end of the lever 10 is connected to a doubletree 12 by the links 13 and the free end of the bar 8 is connected to a second doubletree 14 by the links 15.

Suitably connected to the doubletrees 12 and 14 are a plurality of swingletrees 16. The straps 3 are pivotally connected at 17 to the bar 8 for evenly distributing the pull of the draft animals over the entire evener.

What I claim is:—

A draft equalizer comprising a clevis, a pair of linked auxiliary bars, connections between each of said bars and said clevis, a curved lever carried by one of said auxiliary bars, a main bar intermediate said clevis and said pair of auxiliary bars, a connection between said curved lever and one end of said main bar, a connection between the other auxiliary bar and the main bar, and hitching devices connected with the free end of said main bar and the free end of said curved lever.

In testimony whereof I have signed my name to this specification in the presence of two subscribing witnesses.

JOSEPH MILLER.

Witnesses:
 CARL KRAMER,
 W. P. J. SONDERGARD.

Copies of this patent may be obtained for five cents each, by addressing the "Commissioner of Patents, Washington, D. C."